US008827610B2

(12) United States Patent  
Hoffer et al.

(10) Patent No.: US 8,827,610 B2  
(45) Date of Patent: Sep. 9, 2014

(54) HYDRAULIC COUPLING SYSTEM FOR COUPLING A SHELL MILL TO AN ADAPTER

(75) Inventors: Brad Daniel Hoffer, White, PA (US); Kevin Michael Gamble, Stahlstown, PA (US); Thomas Jerry Long, II, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 546 days.

(21) Appl. No.: 13/204,452

(22) Filed: Aug. 5, 2011

(65) Prior Publication Data

US 2013/0033009 A1  Feb. 7, 2013

(51) Int. Cl.
*B23C 5/26*     (2006.01)
*B23C 5/10*     (2006.01)
*B23B 31/30*    (2006.01)

(52) U.S. Cl.
CPC ........... *B23C 5/265* (2013.01); *B23C 2270/025* (2013.01); *B23C 5/10* (2013.01); *B23B 31/305* (2013.01); *B23C 2210/02* (2013.01)
USPC ......... 409/232; 409/234; 297/4.03; 297/4.01; 408/239 R; 407/40; 82/160

(58) Field of Classification Search
USPC .......... 409/234, 232; 408/233, 232, 240, 226, 408/238, 713, 239 A, 239 R; 279/4.03, 4.1, 279/4.11, 4.01, 2.09; 407/40, 41; 82/160
See application file for complete search history.

(56) References Cited

U.S. PATENT DOCUMENTS

| | | | |
|---|---|---|---|
| 2,744,565 A | 5/1956 | Zwick | |
| 3,626,506 A | 12/1971 | Spieth | |
| 3,677,559 A | 7/1972 | Andre et al. | |
| 4,093,052 A | 6/1978 | Falk | |
| 4,322,190 A * | 3/1982 | Anderson | 409/234 |
| 4,843,709 A * | 7/1989 | Ide | 29/525 |
| 4,861,203 A * | 8/1989 | Bassett et al. | 409/136 |
| 4,964,762 A * | 10/1990 | Arai et al. | 407/34 |
| 4,979,853 A * | 12/1990 | Field | 409/136 |
| 5,429,376 A | 7/1995 | Mueller et al. | |
| 5,542,792 A * | 8/1996 | Krueger et al. | 407/35 |
| 5,944,325 A | 8/1999 | Schmeisl | |
| 6,312,201 B1 * | 11/2001 | Nagaya et al. | 409/234 |
| 6,488,285 B1 | 12/2002 | Allard | |
| 7,270,506 B2 * | 9/2007 | Guy | 409/234 |
| 7,748,934 B2 * | 7/2010 | Zumsteg et al. | 409/232 |
| 2007/0231097 A1 * | 10/2007 | Ballas et al. | 409/136 |
| 2009/0226268 A1 * | 9/2009 | Pilkington | 407/113 |
| 2012/0219368 A1 * | 8/2012 | Gamble | 407/40 |

* cited by examiner

*Primary Examiner* — Eric A Gates  
*Assistant Examiner* — Paul M Janeski  
(74) *Attorney, Agent, or Firm* — Larry R. Meenan, Esq.

(57) ABSTRACT

A hydraulic coupling system includes an adapter, a shell mill, a threaded member, and a chucking membrane. The adapter includes a tapered pilot disposed on and extending from an end face. The shell mill includes a central counter bore for enabling the pilot of the adapter to be inserted therein. The threaded member includes at least one sealing member and is capable of being threaded into a threaded bore of the shell mill. The chucking membrane includes an intermediate portion disposed between two flanges and forms a fluid-tight channel for hydraulic fluid. The chucking member has a tapered inside surface. When the threaded member is threaded into the shell mill, the tapered surfaces of the pilot and the chucking membrane cause an axial force to seat the end face of the shell mill firmly against the end face of the adapter.

9 Claims, 4 Drawing Sheets

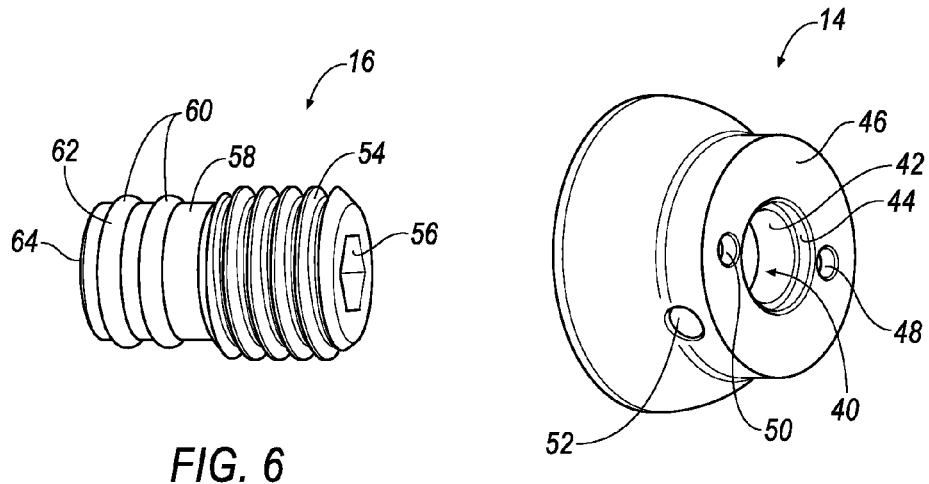
FIG. 6
FIG. 5
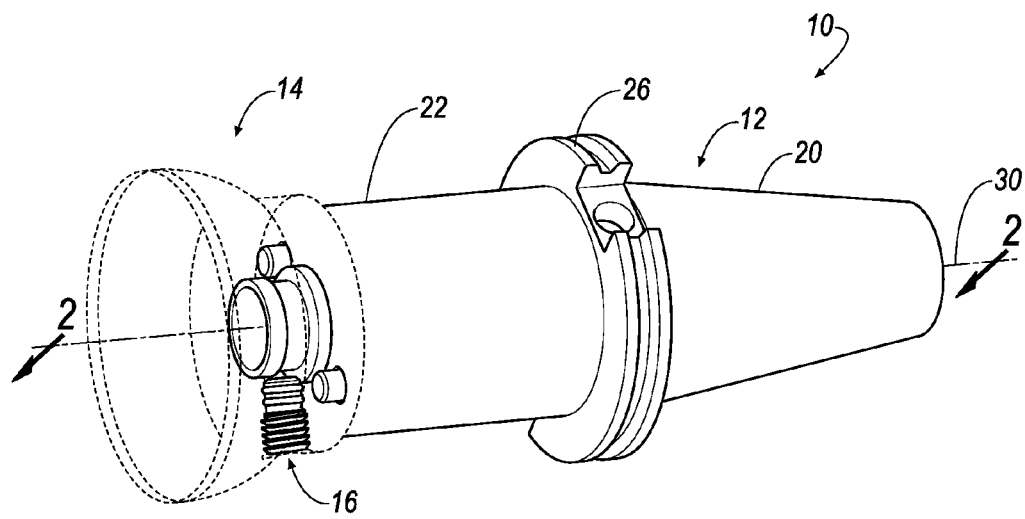
FIG. 1

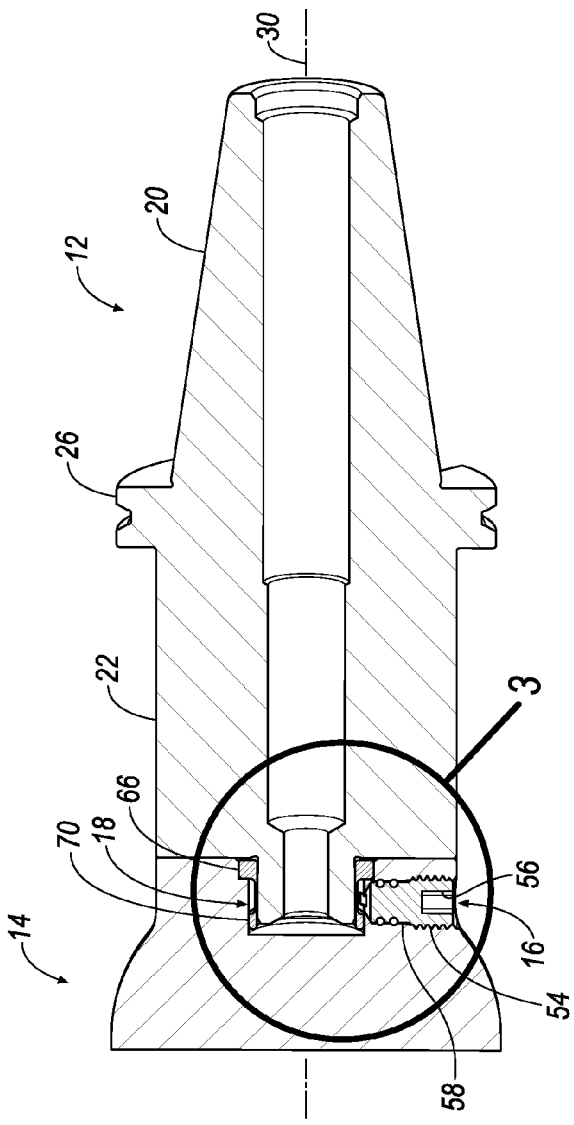
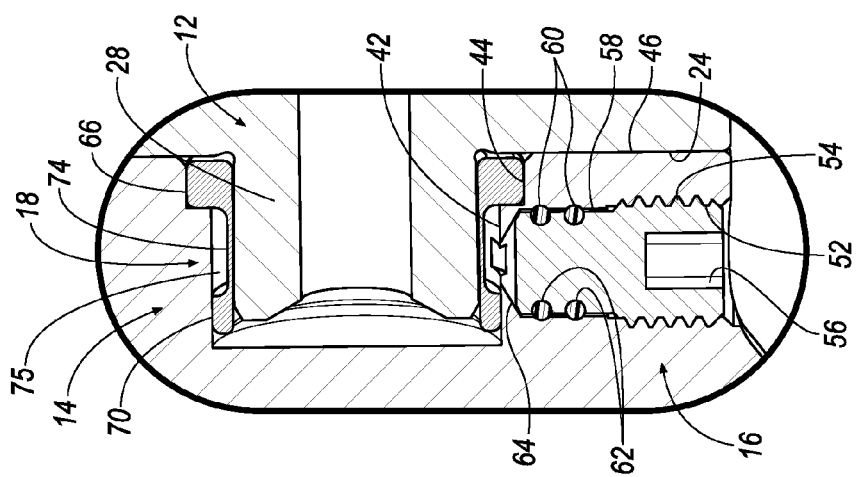

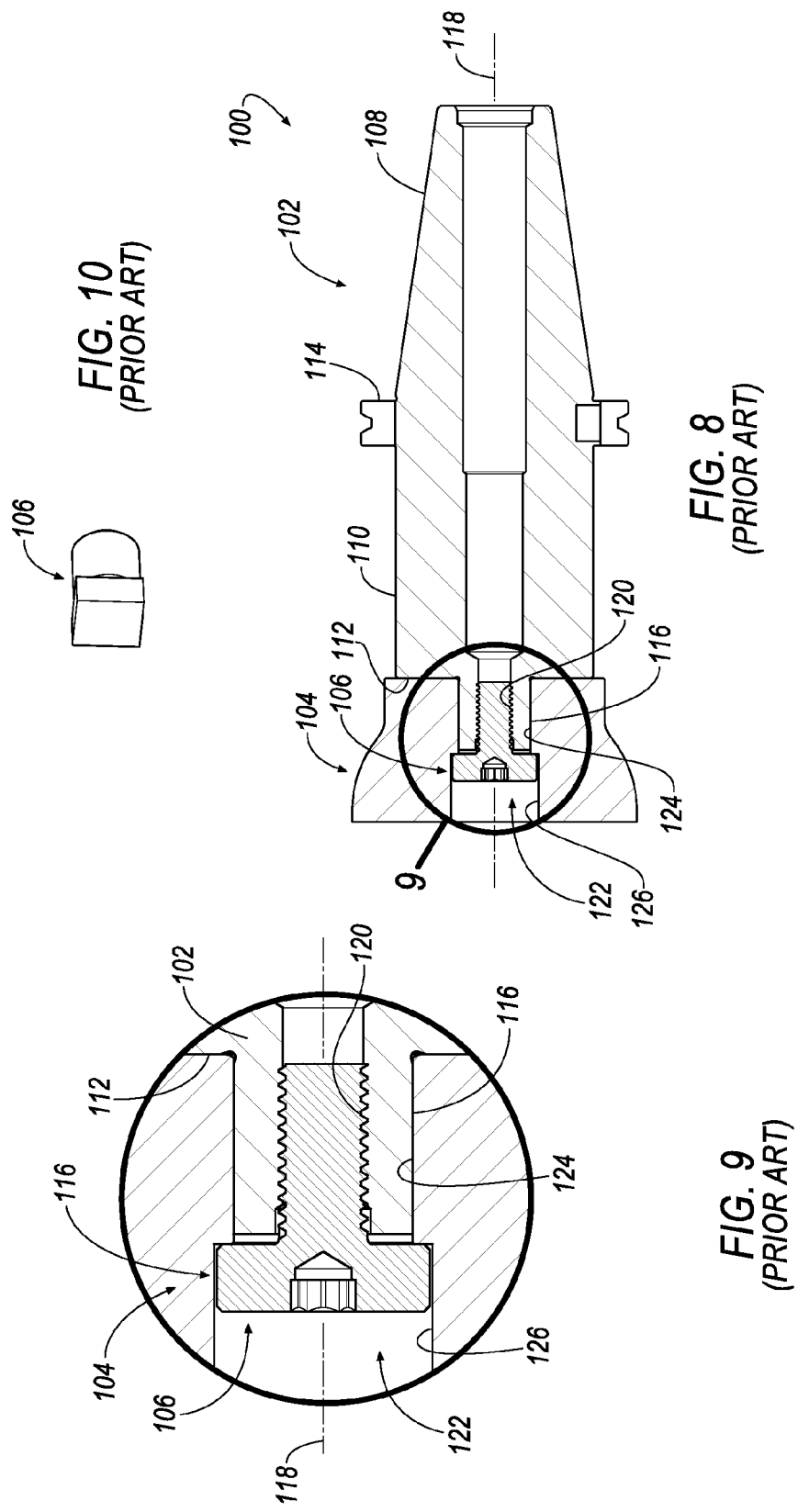

HYDRAULIC COUPLING SYSTEM FOR COUPLING A SHELL MILL TO AN ADAPTER

BACKGROUND OF THE INVENTION

The invention relates to a coupling system for connecting a rotating tool to an adapter. The adapter is then connected to a machine tool. In particular, the invention relates to a hydraulic coupling system for a shell mill in which a threaded screw acts as a piston to cause mating engagement between the shell mill and the adapter.

Referring to FIGS. 8-10, a conventional mounting assembly 100 for a shell mill consists of an adapter 102, a shell mill 104 and a cap screw 106.

The adapter 102 engages a mounting system (not shown) of the machine tool. The adapter 102 includes a tapered shank portion 108 adapted for engaging the machine tool and a non-tapered shank portion 110 that defines an end face 112. The adapter 102 further includes an intermediate flange 114 for automatic handling of the adapter 102. The adapter includes a central boss 116 disposed on and extending from the end face 112 concentric about a central, longitudinal axis 118 of the assembly 100. The central boss 116 has a threaded bore 120 concentric about the longitudinal axis 118 of the assembly 100.

The shell mill 104 includes a central bore 122 having a first diameter portion 124 that enables the central boss 116 of the adapter 102 to be inserted therein. The bore 122 also includes a second, larger diameter portion 126 for receiving a cap screw 106. The shell mill 104 is brought into firm engagement with the adapter 102 by threading the cap screw 106 into the central boss 116 of the adapter 102.

Although the conventional coupling system 100 is adequate for most applications, it would be desirable to provide a coupling system that can be used where the space is limited on smaller cutters by eliminating counter bores for the bolt, and will improve run out when mounted on the adapter.

SUMMARY OF THE INVENTION

The inventors of the invention has solved the problems associated with conventional coupling system by providing a coupling system that can be used where the space is limited on smaller cutters by eliminating counter bores for the bolt, and will improve run out when mounted on the adapter.

In one aspect, a hydraulic coupling system comprising an adapter, a shell mill at least partially received in a pilot of the adapter, and a chucking membrane disposed between the adapter and the shell mill in such a way that a space between a portion of the chucking membrane and the shell mill forms a fluid-tight channel for hydraulic fluid, wherein the coupling system uses hydraulic pressure to cause the shell mill to be brought into firm engagement with the adapter.

In another aspect, a hydraulic coupling system comprises an adapter, a shell mill, a threaded member, and a chucking membrane. The adapter includes a pilot disposed on and extending from an end face. The pilot has an outer surface formed at a non-zero angle with respect to a central, longitudinal axis of the hydraulic coupling system. The shell mill includes a central counter bore for enabling the pilot of the adapter to be inserted therein. The threaded member includes a threaded head portion and a shaft portion having at least one sealing member. The threaded member is capable of being threaded into a threaded bore of the shell mill. The chucking membrane includes a first flange at one end, a second flange at an opposite end, and an intermediate portion disposed between the first and second flanges. The chucking member has an inside surface formed at a non-zero angle with respect to the central, longitudinal axis of the hydraulic coupling system. The chucking membrane is disposed between the pilot of the adapter and the shell mill in such a way that the intermediate portion forms a fluid-tight channel for hydraulic fluid. The threaded member exerts pressure against the hydraulic fluid, which causes pressure to be against the chucking membrane, and in turn, causes the chucking membrane to exert pressure against the pilot of the adapter. The non-zero angles of the pilot and the chucking membrane causes an axial force to seat the end face of the shell mill firmly against the end face of the adapter.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 is an isometric view of a hydraulic coupling system for a shell mill according to an embodiment of the invention;

FIG. 2 is a cross-section view of the hydraulic coupling system taken along line 2-2 of FIG. 1;

FIG. 3 is an enlarged view of the adapter, the shell mill, the threaded member and the chucking membrane encircled in FIG. 2;

FIG. 5 is an isometric view of the shell mill of the hydraulic coupling system;

FIG. 6 is an isometric view of the threaded member of the hydraulic coupling system;

FIG. 8 is an isometric view of a conventional coupling system for coupling a shell mill to an adapter;

FIG. 9 is an enlarged view of the adapter, the shell mill, and the standard cap screw encircled in FIG. 8; and FIG. 10 is an isometric view of the square-shaped head drive key of the conventional coupling system of FIG. 8.

DETAILED DESCRIPTION OF THE INVENTION

Figure 4:
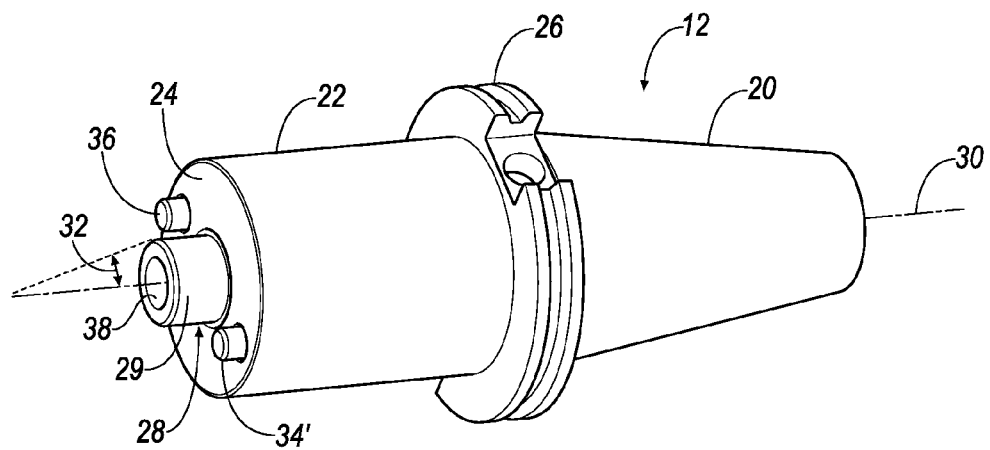
FIG. 4 is an isometric view of the adapter of the hydraulic coupling system.

Referring to the drawings, there should be an appreciation that the hydraulic coupling system of the invention can operate in a number of different applications other than for a shell mill.

Referring to FIGS. 1-3, a hydraulic coupling system 10 for coupling a shell mill to an adapter is shown according to an embodiment of the invention. In general, the hydraulic coupling system 10 comprises of an adapter 12, a shell mill 14. a threaded member 16, and a chucking membrane 18.

Referring now to FIGS. 1-4, the adapter 12 engages a mounting system (not shown) of a machine tool (not shown). The adapter 12 includes a tapered shank portion 20 adapted for engaging the machine tool and a non-tapered shank portion 22 that defines an end face 24. The adapter 12 further includes an intermediate flange 26 for automatic handling of the adapter 12.

It should be appreciated that a mounting feature, such as a threaded hole (not shown) may be disposed within the tapered shank 20 for attaching the adapter 12 to the machine tool. Further, the adapter 12 may include a bore (not shown) extending through the adapter 12 for providing a flow of coolant material from the machine tool to the cutting apparatus (not shown). As shown, the adapter 10 is a CV-type adapter manufactured by Kennametal Inc. It is to be appreciated that the adapter 12 may be of any type known by those of ordinary skill in the art to be suitable for mounting a rotating tool to a machine tool, such as DV-, BT- or KM-type adapters manufactured by Kennametal Inc., CAPTO (Coromont) type adapters, or HSK-type adapters.

The adapter 12 includes a pilot 28 disposed on and extending from the end face 24 concentric about a central, longitudinal axis 30 of the coupling system 10 when assembled. One aspect of the invention is that the outer surface 29 of the pilot 28 defines a non-zero angle 32 with respect to the longitudinal axis 30 when the coupling system 10 is assembled. In other words, the outer surface 29 of the pilot 28 proximate the end face 24 is slightly larger in diameter than the outer surface 29 distal the end face 24 of the adapter 12. In one embodiment, the angle 32 is in a range between about five minutes to about five degrees, and preferably in a range between about ten minutes to about one degree, fifteen minutes. In the illustrated embodiment, the angle 32 of the outer surface 29 of the pilot 28 is about thirty minutes. It will be appreciated that the angle 32 can be any desirable angle, depending on the length of the pilot 28. In addition, the adapter 12 includes a pair of round drive pins 34, 36 disposed on and extending from the end face 24.

The pilot 28 may include a threaded bore 38 concentric about the longitudinal axis 30 of the coupling system 10 when assembled. Unlike the conventional coupling system 100, the threaded bore 38 is not needed in the hydraulic coupling system 10 of the invention. In addition, the standard cap screw is also not needed in the hydraulic coupling system 10 of the invention. As a result, the assembly of the hydraulic coupling system 10 of the invention is greatly simplified as compared to the conventional coupling system 100.

Referring now to FIGS. 1-3 and 5, the shell mill 14 includes a central counter bore 40 having a first diameter portion 42 that enables the pilot 28 of the adapter 12 to be inserted therein. The counter bore 40 also includes a second, larger diameter portion 44 proximate an end face 46 of the shell mill 14. The end face 46 includes a pair of round apertures 48, 50 that are capable of receiving the pair of round pins 34, 36 extending from the end face 24 of the adapter 12. The shell mill 14 also includes a threaded bore 52 for receiving the threaded member 16.

Referring now to FIGS. 1-3 and 6, the threaded member 16 includes a threaded head portion 54 with a hexagonal-shaped aperture 56 for receiving a tool, such as an Allen wrench, and the like. The threaded member 16 also includes a shaft portion 58 having at least one sealing member 60, such as an O-ring, and the like. In the illustrated embodiment, the threaded member 16 has two O-rings 60 that are seated within a groove 62 formed in the shaft portion 58. The O-rings 60 provide a seal to prevent hydraulic fluid from exiting through the threaded bore 52 of the shell mill 14. The shaft portion 58 has a conical-shaped end 64 that seats into the tapered bottom of the threaded bore 52.

Figure 7:
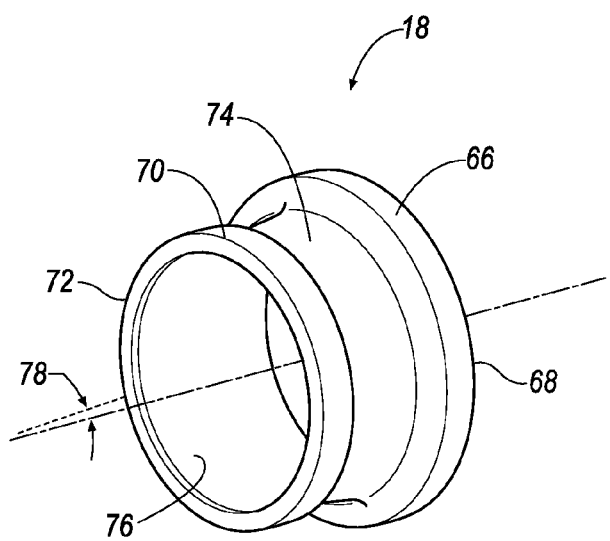
FIG. 7 is an isometric view of the chucking membrane of the hydraulic coupling system.

Referring now to FIGS. 1-3 and 7, the chucking membrane 18 is generally annular in shape and includes a first annular flange 66 at one end 68, a second annular flange 70 at an opposite end 72, and an intermediate portion 74 disposed between the first and second flanges 66, 70. The first flange 66 has an outer diameter that is larger than both the second flange 70 and the intermediate portion 74, and the second flange 70 has an outer diameter that is larger than the intermediate portion 74. In other words, the intermediate portion 74 has an outer diameter that is smaller than both the first and second flanges 66, 70. As a result, the space between the intermediate portion 74 and the chucking membrane 18 forms a fluid-tight channel 75 for hydraulic fluid when the hydraulic coupling system 10 is assembled, as shown in FIG. 3.

One aspect of the invention is that the inside surface 76 of the chucking membrane 18 defines a non-zero angle 78 with respect to the longitudinal axis 30 of the coupling system 10 when assembled. In other words, the inside diameter proximate the end 68 is slightly larger than the inside diameter distal the end 68 of the chucking membrane 18. It is noted that the angle 78 of the inner surface 76 of the chucking membrane 18 is approximately equal to the angle 32 of the outer surface 29 of the pilot 28. In one embodiment, the angle 78 is in a range between about five minutes to about five degrees, and preferably in a range between about ten minutes to about one degree, fifteen minutes. In the illustrated embodiment, the angle 78 of the inner surface 76 is about thirty minutes.

To assemble the hydraulic coupling system 10 the shell mill 14 is placed around the chucking membrane 18 such that the first flange 66 of the chucking membrane 18 is received in the second, larger diameter portion 44 and the second flange 70 is receiving in the first diameter portion 42 of the shell mill 14. In other words, the chucking member 18 is disposed between the shell mill 14 and the pilot 28 of the adapter 12. In addition, the round pins 34, 36 of the adapter 12 are received in the apertures 48, 50 of the shell mill 14. At this point, the adapter 12, the shell mill 14 and the chucking membrane 18 are substantially aligned with one another along the central, longitudinal axis 30 of the coupling system 10, and the end face 46 of shell mill 14 abuts the end face 24 of the adapter 12, as shown in FIG. 3. It should be noted that the chucking membrane 18 has already been assembled into the shell mill 14 by using any conventional means, such as by threading, welding, and the like.

Next, hydraulic fluid is introduced through the threaded bore 52 of the shell mill 14 until the fluid substantially fills the annular channel formed between the intermediate portion 74 of the chucking membrane 18 and the first diameter portion 42 of the shell mill 14. Then, the threaded member 16 is threaded into the threaded bore 52 of the shell mill 14. At a certain point as the threaded member 16 is continued to be threaded into the threaded bore 52, the conical-shaped end 64 of the threaded member 16 exerts pressure against the hydraulic fluid. In turn, the hydraulic fluid will exert pressure against the chucking member 18 and push against the pilot 28 of the adapter 12. Due to the non-zero angles 32, 78 of the pilot 28 and chucking membrane 18, respectively, an axial force is created to cause the shell mill 14 to be firmly seated against the end face 24 of the adapter 12.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A hydraulic coupling system comprising an adapter, a shell mill at least partially received in a pilot of the adapter, a chucking membrane disposed between the adapter and the shell mill in such a way that a portion of the chucking membrane forms a fluid-tight channel for hydraulic fluid, and a threaded member having a least one sealing member for providing a seal for the hydraulic fluid within the coupling system, the threaded member capable of being threaded into a threaded bore of the shell mill, wherein the coupling system uses hydraulic pressure to cause the shell mill to be brought into firm engagement with the adapter.

2. The hydraulic coupling system according to claim 1, wherein the shell mill includes a central counter bore for enabling the pilot of the adapter to be inserted therein.

3. The hydraulic coupling system according to claim 1, wherein the chucking membrane includes a first flange at one end, a second flange at an opposite end, and an intermediate portion disposed between the first and second flanges.

4. The hydraulic coupling system according to claim 1, wherein the pilot of the adapter has an outer surface formed at a non-zero angle with respect to a central, longitudinal axis of the coupling system.

5. The hydraulic coupling system according to claim 1, wherein the chucking membrane has an inside surface formed at a non-zero angle with respect to a central, longitudinal axis of the coupling system.

6. The hydraulic coupling system according to claim 5, wherein the non-zero angles of the pilot and the chucking membrane causes an axial force is be created to seat an end face of the shell mill firmly against an end face of the adapter.

7. A hydraulic coupling system, comprising:
- an adapter including a pilot disposed on and extending from an end face, the pilot having an outer surface formed at a non-zero angle with respect to a central, longitudinal axis of the hydraulic coupling system;
- a shell mill including a central counter bore in an end face for enabling the pilot of the adapter to be inserted therein;
- a threaded member including a threaded head portion and a shaft portion having at least one sealing member, the threaded member capable of being threaded into a threaded bore of the shell mill; and
- a chucking membrane including a first flange at one end, a second flange at an opposite end, and an intermediate portion disposed between the first and second flanges, the chucking membrane having an inside surface formed at a non-zero angle with respect to the central, longitudinal axis of the hydraulic coupling system, the chucking membrane being disposed between the pilot of the adapter and the shell mill in such a way that the intermediate portion forms a fluid-tight channel for hydraulic fluid,
- wherein the threaded member exerts pressure against the hydraulic fluid, which causes pressure to be against the chucking membrane, and in turn, causes the chucking membrane to exert pressure against the pilot of the adapter, and
- wherein the non-zero angles of the pilot and the chucking membrane cause an axial force to seat the end face of the shell mill firmly against the end face of the adapter.

8. The coupling system according to claim 7, wherein the non-zero angles of the pilot and the chucking membrane is in a range between about one degree to about ten degrees.

9. The coupling system according to claim 7, wherein the end face of the shell mill includes a pair of round apertures that are capable of receiving a pair of drive pins extending from the end face of the adapter.

\* \* \* \* \*